Patented June 17, 1941

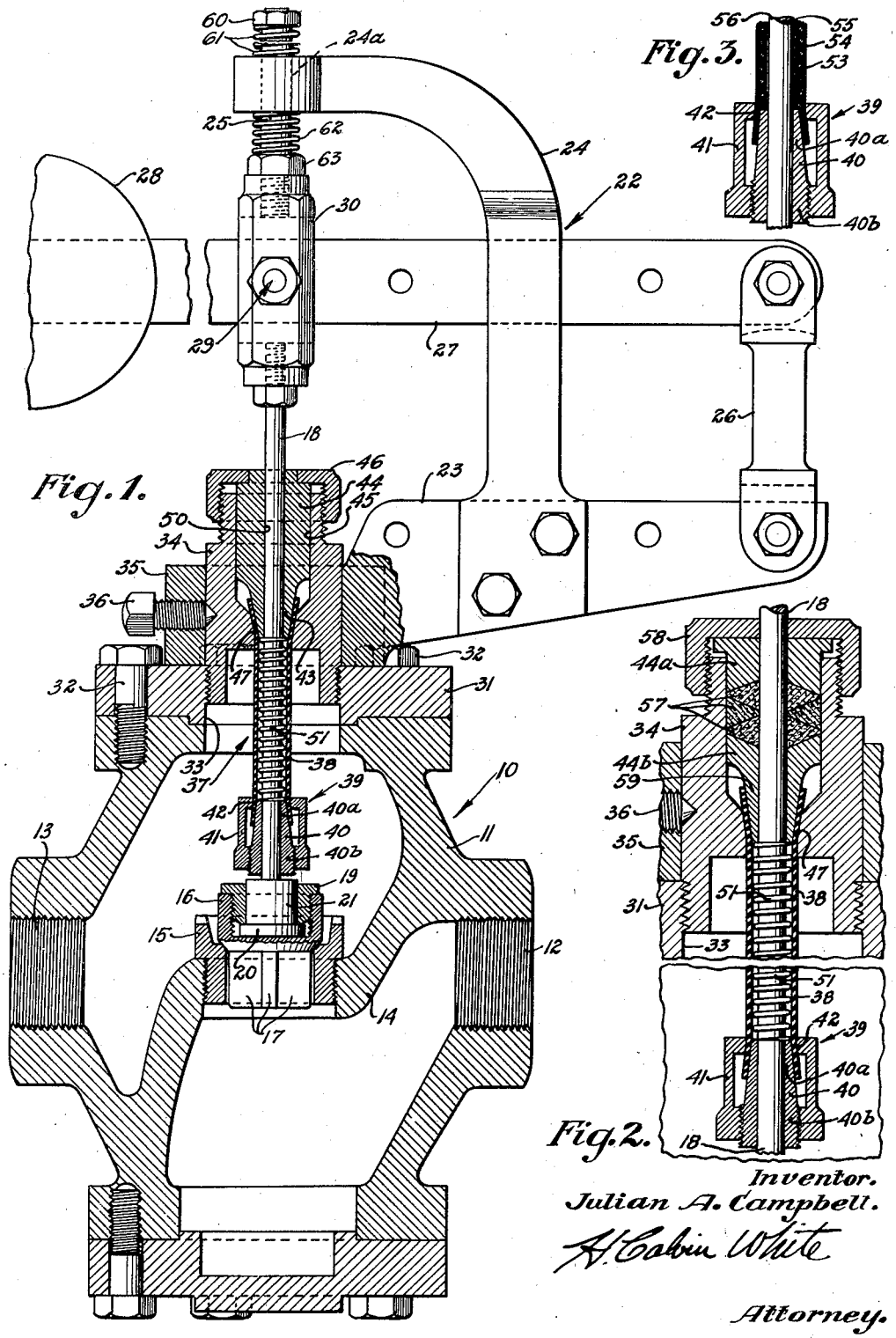

2,245,648

UNITED STATES PATENT OFFICE 2,245,648

VALVE SEAL

Julian A. Campbell, Long Beach, Calif.

Application January 25, 1939, Serial No. 252,786

2 Claims. (Cl. 251—31)

This invention has for its object to provide a positive leak-proof seal about movable stems or rods extending into bodies containing fluid under pressure, and while the invention generally is applicable to various specific types and forms of apparatus, it is particularly advantageous as a fluid seal for valve stems and therefore will be described specifically, though typically, in that form.

The customary method of sealing around valve stems is to use packing glands provided with a suitable form of take-up for tightening the packing against the stem as the packing becomes worn. Long experience has demonstrated that, at least for certain purposes, particularly where it is required to seal against leakage of high temperature, high pressure or corrosive fluids, the usual packing glands are inadequate to maintain a proper seal. This may be due to one or a number of different conditions. For example, it is difficult and ordinarily impossible, except temporarily, to maintain between the relatively moving valve stem and packing, a positive seal against extremely high pressure fluids, especially those of high fluidity such as gases and high temperature liquids. The latter, despite actual contact between the packing and the stem, tend to creep along the stem and escape through the packing gland. Again, the stem frequently is exposed to corrosive or oxidizing fluids which form on the stem a scale that in turn abrades and cuts away the packing as a result of the stem movement, so that despite frequent take-up of the packing, there is practically continuous leakage through the gland. Finally, the more tightly the packing is pressed against the stem to prevent fluid leakage, the less freedom the stem has for movement; in fact in some cases the stem may become tightly held by the packing.

In accordance with the invention, I am able to entirely obviate all these difficulties that characterize the usual packing glands, by providing a widely different form of sealing medium by means of which it is possible to maintain a positive seal preventing fluid leakage along the stem and at the same time allow the stem absolute freedom of movement. The present form of seal involves the use of a longitudinally deformable tube placed about the valve stem and having at longitudinally spaced points, or at its opposite ends, leak-proof connections with the stem and body respectively. It will be understood that in the broad aspects of the invention the tube may be made in any desired manner and of any suitable material so long as it is possessed of adequate strength and longitudinal deformability rendering it responsive or conformable to the movements of the stem, as well presently appear. I prefer to form the tube of an elastic material such as natural or synthetic rubber, and to proportion the tube so that the stem movement occurs within elastic or combined elastic and compressive ranges of the tube, that will not subject it to excessive strain.

In order to insure freedom of stem movement within the tube, suitable provisions are made for preventing the tube from becoming pressed into binding engagement with the stem, as a result, for example, of the body fluid pressure exteriorly applied to the tube. For this purpose, I preferably provide a reinforcement interiorly supporting or imbedded in the tube and of sufficient strength to withstand the exterior pressure on the tube. This reinforcement may conveniently take the form of a coil spring placed between the tube and stem, and which may serve the added function of a valve-closing spring. Then, in order to insure maximum freedom and assist in the valve stem movement, I may make additional provision for counter-balancing the stresses set up in the tube as a result of stem movement, and counter-balancing also the thrust of the tube supporting spring where that form of tube reinforcement is used.

The invention has various additional features and objects, but these as well as the details of a typical and illustrative embodiment of the invention will be understood more fully and to better advantage from the description to follow. Throughout the description reference is made to the accompanying drawing in which:

Fig. 1 is a sectional view showing my improved stem seal applied to a typical valve mechanism;

Fig. 2 is a fragmentary enlarged section showing the joints between the tube, stem and body, and illustrating also a variant feature of the invention; and Fig. 3 is a fragmentary sectional view showing another variational feature.

The typical form of valve device indicated generally at 10 in Fig. 1 comprises the usual body 11 having an inlet 12, an outlet 13, and an intermediate partition 14 into which is threaded the valve seat 15. The valve 16 carrying the usual depending guide 17 is attached to the stem 18 by a bushing 19 threaded against flange 20 of the valve stem head 21. In conjunction with the valve I have shown the usual counter-balancing or pressure regulating mechanism, generally indicated at 22, by means of which the valve 16 is controlled to open at predetermined pressure. The mechanism 22 comprises a bracket 23 mounted on the valve body and supporting a guide 24 through the upper end 24a of which the valve stem guide extension 25 extends. Bracket 23 is also connected by link 26 with the usual lever 27 carrying at its outer end a counterweight 28 and having at 29 a pivotal connection with coupling 30 that interconnects the stem 18 and guide extension 25. A flange 31 attached by screws 32 to the top of the body 11 has a bore 33 into which is threaded a tubular box member 34. The annular portion 35 of bracket 23 is fitted over the box 34 and is releasably attached thereto by one or more set screws 36.

The valve stem seal, generally indicated at 37, comprises the longitudinally deformable tube 38 which, as I have indicated, preferably is made of a rubber composition of necessary strength and resistance to pressure and temperature conditions within the valve body. I find synthetic rubber, for example "neoprene," to be particularly suitable as the tube forming material, although other synthetic or natural rubber compositions may be used. And in this connection it may be mentioned that where in the claims the term "rubber" is used, it is intended to be definitive of synthetic as well as natural rubber compositions.

At its lower end, tube 38 has a fluid tight connection at 39 with the valve stem 18, in the form of a wedge-shaped or frusto-conical sleeve 40 shrunk upon or otherwise suitably applied to the stem with a fluid tight fit. The upper portion 40a of the sleeve 40 is received within the lower end of the tube 38, and on the lower portion 40b of the sleeve is threaded a nut 41 having an inwardly projecting, slightly rounded surface flange 42 bearing against the tube 38 and pressing it against the wedge 40a with a fluid tight fit. Inserted within the upper end of the tube is an annular wedge-shaped extension 43 of a plug 44 inserted within the bore 45 of box 34. By turning down nut 46 bearing against the upper end of plug 44, the wedge 43 presses and expands the tube 38 into fluid tight engagement with the lower frusto-conical bore 47 of the box 34. Thus the sealing tube has in effect, a fluid tight connection at its upper end with the body, and a fluid tight connection at its lower end with the valve stem. It will also be observed that the stem 18 is completely sealed against contact by the fluid passing through the valve body, with the result that the stem will retain its original polish and indefinitely remain free of scale that otherwise would tend to score the stem guide bore 50 of the plug 44.

It is desirable in order to insure free movement of the valve stem, that the tube 38 be prevented from becoming pressed or radially constricted by the fluid pressure within the valve body, into binding engagement with the valve stem. For this purpose I may reinforce or interiorly support the tube, as for example, by placing between the tube and stem a coil spring 51 having sufficient clearance from the stem to permit it to move freely. The spring provides uniform and balanced support longitudinally as well as circumferentially within the tube, and is found in actual practice to enable the tube to withstand high fluid pressures over long periods, without signs of failure. Bearing terminally against the wedge means 43 and 40a, the spring 51 may serve an added function in providing a force tending to close the valve 16. This feature in itself is not essential in a pressure regulated or balanced valve assembly of the specific type illustrated, but may be of greater importance in other types of valve mechanisms.

In Fig. 3 I show a variational tube reinforcement in the form of a series of metal annulae 53 imbedded in the rubber wall of the tube 54. These annulae 53 may take the form of a continuously coiled spring, or one having its spirals interrupted at each turn in order to permit unrestricted longitudinal deformability of the tube, or the elements 53 may consist of individual, continuous annulae, in the form of rings. A suitable lubricant, such as graphite, may be placed in the space 55 between the tube 54 and stem 56 as an anti-friction medium between the parts. A lubricant similarly may be placed between tube 38 and stem 18 in the first described form, and by virtue of the lubrication given the stem within the tube, it may be possible in some instances where the tube is not subjected to high external pressures, to dispense with the spring 51 or other tube reinforcement.

The length of tube 38 between its points of attachment to the body and stem may be adjusted with relation to the maximum movement of the stem between full open and closed valve positions, so that the tube will be subjected only to longitudinal compression without tensile strain or elongation beyond its normal length, or so that between the limits of valve movement the tube will undergo both tension and compression. The former condition is preferable, and therefore the length of the tube will be determined (by predetermining the spacing of the connection 39 from the connection of the upper end of the tube at 47) so that the tube will assume its normal length and condition at closed position of the valve. As the valve then opens, the elastic tube is compressed along with the spring. In this connection it may be mentioned that although separate units, the tube 38 and spring 51 move substantially as one in their longitudinal deformation. This is due to the fact that the turns of the spring are spaced sufficiently closely to give the tube uniform support longitudinally, as well as circularly, and the further fact that the external pressure on the tube tends to impress the spring turns into the inner surface of the tube so that the tube and spring expand and contract together uniformly and in the same degree.

For the purpose of further insuring free movement of the valves and stem, it may be desirable to counterbalance the forces resulting from the longitudinal deformation of the sleeve or compression of the spring 51, or both. For this purpose I may place between the valve stem guide 24a and an adjustable nut 60 threaded on the upper end of the stem extension 25 a coil spring 61, the tension of which is regulated to counterbalance the resistance to the valve stem movement caused by deformation of the tube 38 and spring 51. At closed position of the valve 16 spring 61 is compressed to resist stem movement in valve closing direction; then as the valve opens and tube 38 and spring 51 become longitudinally compressed, the spring 61 expands to compensate for and balance the opposing force applied to the stem as a result of the tube and spring compression. If instead of undergoing only longitudinal compression within the range of valve movement, tube 38 is subjected to tensile strain, the resultant force transmitted to the stem may be compensated in a manner similar to the described method of compensating for compression and deformation. In this instance, the compensating spring 62 may be placed between guide 24a and the stem carried nut 63, spring 62 being expanded at closed valve position, but undergoing compression as the valve opens and the tube is relieved of tensional strain.

If for any reason the tube 38 should fail, or leakage into the tube occur, it may be desirable to provide an auxiliary packing gland that will seal about the rod until repair or replacement of the sealing tube can be made. As illustrated in Fig. 2, I may provide such a packing gland within the box 34 by forming the plug in upper and lower sections 44a and 44b between which is placed suitable packing 57. By turning down nut 58 the packing may be properly compressed and the wedge 59 forced down into the rubber tube to maintain a fluid tight joint.

As will be apparent, the various parts may easily be assembled within the valve body, or disassembled for the purpose of inspecting or replacing the sealing tube. After removing the bracket 23, box 34 may be unscrewed and the entire valve and rod assembly removed from the body. By then unscrewing nuts 41 and 46, the tube 38 may be freed for removal. In fact, the entire operation of replacing tube 38 may be accomplished in a few minutes time.

I claim:

1. In a steam seal of the character described, the combination comprising a body, a longitudinally movable stem extending into said body, a longitudinally deformable elastic tube surrounding said stem and subjected to longitudinal strain as a result of movement of the stem, means providing fluid tight connections between longitudinally spaced portions of the tube and said body and stem respectively, a spring resisting movement of the stem in one direction, and yielding means outside said body exerting against said stem a force compensating for resistance offered by said spring and longitudinal strain of said tube, the last mentioned means comprising a bracket mounted on said body, and a spring encircling said stem and bearing against the bracket.

2. In a stem seal of the character described, the combination comprising a body, a longitudinally movable stem extending into said body, a longitudinally deformable elastic tube surrounding said stem and subjected to longitudinal strain as a result of movement of the stem, means providing fluid tight connections between longitudinally spaced portions of the tube and said body and stem respectively, a spring placed about the stem within a section of the tube, said spring resisting movement of the stem in one direction and preventing said section of the tube from becoming pressed by exteriorly applied fluid pressure within the body into binding engagement with the stem, and yielding means outside said body exerting against said stem a force compensating for resistance offered by said spring and longitudinal strain of said tube, the last mentioned means comprising a bracket mounted on said body, and a spring encircling said stem and bearing against the bracket.

JULIAN A. CAMPBELL.

CERTIFICATE OF CORRECTION

Patent No. 2,245,648.　　　　　　　　　　　　　　　June 17, 1941.

JULIAN A. CAMPBELL.

It is hereby certified that error appears in the printed specification of the above numbered patent requiring correction as follows: Page 3, first column, line 32, claim 1, for the word "steam" read --stem--; and that the said Letters Patent should be read with this correction therein that the same may conform to the record of the case in the Patent Office.

Signed and sealed this 22nd day of July, A. D. 1941.

(Seal)

Henry Van Arsdale,
Acting Commissioner of Patents.